(12) United States Patent
Abdollahi (10) Patent No.: US 7,525,669 B1
(45) Date of Patent: Apr. 28, 2009

(54) HIGH-SPEED, SCANNING PHASE-SHIFTING PROFILOMETRY USING 2D CMOS SENSOR

(76) Inventor: Mohsen Abdollahi, 9008 Cannstatt Dr., Huntsville, AL (US) 35802

( * ) Notice: Subject to any disclaimer, the term of this patent is extended or adjusted under 35 U.S.C. 154(b) by 984 days.

(21) Appl. No.: 10/887,673

(22) Filed: Jul. 9, 2004

(51) Int. Cl.
*G01B 11/24* (2006.01)

(52) U.S. Cl. ..................................... 356/603

(58) Field of Classification Search .......... 356/603–605
See application file for complete search history.

(56) References Cited

U.S. PATENT DOCUMENTS

| | | | |
|---|---|---|---|
| 4,641,972 | A | 2/1987 | Halioua et al. |
| 5,085,502 | A * | 2/1992 | Womack et al. ............. 356/605 |
| 5,135,308 | A * | 8/1992 | Kuchel ........................ 356/604 |
| 5,175,601 | A * | 12/1992 | Fitts ............................. 356/604 |
| 5,471,303 | A | 11/1995 | Ai et al. |
| 5,646,733 | A | 7/1997 | Bieman |
| 6,040,910 | A | 3/2000 | Wu et al. |
| 6,208,416 | B1 | 3/2001 | Huntley et al. |
| 6,438,272 | B1 | 8/2002 | Huang et al. |
| 6,509,559 | B1 | 1/2003 | Ulrich et al. |
| 6,522,777 | B1 | 2/2003 | Paulsen et al. |
| 6,525,331 | B1 | 2/2003 | Ngoi et al. |
| 6,580,496 | B2 * | 6/2003 | Bamji et al. .................. 356/5.1 |
| 6,639,685 | B1 | 10/2003 | Gu et al. |
| 6,897,946 | B2 * | 5/2005 | Uomori et al. ............... 356/3.1 |
| 6,952,270 | B2 * | 10/2005 | Shirley ........................ 356/603 |
| 7,306,341 | B2 * | 12/2007 | Chang ......................... 353/94 |
| 7,315,383 | B1 * | 1/2008 | Abdollahi .................... 356/601 |

OTHER PUBLICATIONS

Halioua, M. and Liu, H.C. "Optical Three-Dimensional Sensing by Phase Measuring Profilometry", Opt. Lasers Eng., 1989, 185-215, vol. 11(3).
Greivenkamp, J. E. and Bruning, J. H. "Phase Shifting Interferometry", Optical Shop Testing D. Malacara (Editor), 1992, Wiley, New York.
Srinivsan, V., Liu, H.C. and Halioua, M. "Automated Phase-Measuring Profilometry at 3D Diffuse Objects" Applied Optics, 1984, 3105-3108, vol. 23, No. 18.
Dorrio, B.V. and Fernandez, J. L. "Phase Evaluation Methods in Whole Field Optical Measurement Techniques", Measurement Science Technology, 1999, 33-55, vol. 10.
Asundi, A "Fringe Analysis in Moire' Interferometry", Proc. SPIE 1991, 472-480, vol. 1554B.
Zebker, H.A. and Lu, Y. "Phase Unwrapping Algorithms for Radar Interferometry: Residue Cut, Least Square and Synthesis Algorithms", J. Opt. Soc. Am. 1998, 586-598, vol. 15, No. 3.

(Continued)

*Primary Examiner*—Patrick J Connolly
(74) *Attorney, Agent, or Firm*—Mark Clodfelter (57) ABSTRACT

A high speed, phase shifting scanning profilometry system is disclosed. A high speed CMOS sensor having more than 3 rows of pixels, in one embodiment having 1024, each row of which being randomly accessible, is positioned above a workpiece movable below the camera. The workpiece is illuminated in a non-uniform manner by an illumination source configured to project a predetermined pattern or gradient of light. As the workpiece is moved under the sensor, selected rows of pixels register the non-uniform light reflected from the workpiece and provide the data to a computer for calculating a surface profile for that row.

17 Claims, 11 Drawing Sheets

OTHER PUBLICATIONS

Herraez, M.A., Gd isat, M.A., Burton, D. R. and Lalor, M.J., Robust, Fast and Effective Two-Dimensional Automatic Phase Unwrapping Algorithm Based on Image Decomposition, Applied Optics, 2002, 7445-7455, vol. 41, No. 35.

Herraez, M.A., Burton, D.R., Lalor, M.J, and Gdiesat, M.A., Fast Two-Dimensional Phase Unwrapping Algorithm. Based on Sorting by Reliability Following a Noncontinuous Path, Applied Optics, 2002, 7437-7444, vol. 41, No. 35.

Asundi, A. and Wensen, Z. "Fast Phase-Unwrapping Algorithm Based on a Gray-Scale Mask and Flood-Fill", Applied Optics, 1998, 5416-5420, vol. 37 No. 23.

Arai, Y., Yekozeki, S. and Yamada, T. "Three-Dimensional Automatic Precision Measurement System by Liquid Crystal Plate of Moire Typography" Proc. SPIE, 1991, 266-274, vol. 1554B.

\* cited by examiner

Prior Art

HIGH-SPEED, SCANNING PHASE-SHIFTING PROFILOMETRY USING 2D CMOS SENSOR

FIELD OF THE INVENTION

This invention relates to an optical scanning phase-shifting technique for measuring three-dimensional data within a scene, and more particularly to a method for capturing phase-shifted images. Applicant's technique offers 2 D image capture as well as high-speed, phase-shifted image acquisition. Also, Applicant's technique offers mechanisms for addressing commonly-known issues related to phase-shifting profilometry such as improving phase-shifting intervals, increasing an imaging dynamic range to deal with a scene containing objects of different reflectivity, optimizing and controlling a measuring resolution and range, overcoming shadowing effect as well as other advantages.

BACKGROUND OF THE INVENTION

There has been an ever-increasing need for high-speed and accurate three-dimensional measurement systems. This is particularly true in the electronics manufacturing industry. One main drive behind this continuous need is miniaturization of electronics components or sub-assemblies. As components become smaller, need for controlling and monitoring manufacturing quality becomes greater. At the same time, trends toward high-throughput, automated manufacturing lines continue to grow at a fast rate. In turn, this requires non-contact measurement methods because tactile measuring systems are to slow, and at times, completely impractical. For this reason, non-contact optical techniques for measuring dimensions of parts or checking integrity of assemblies have become extremely popular.

Figure 1A:
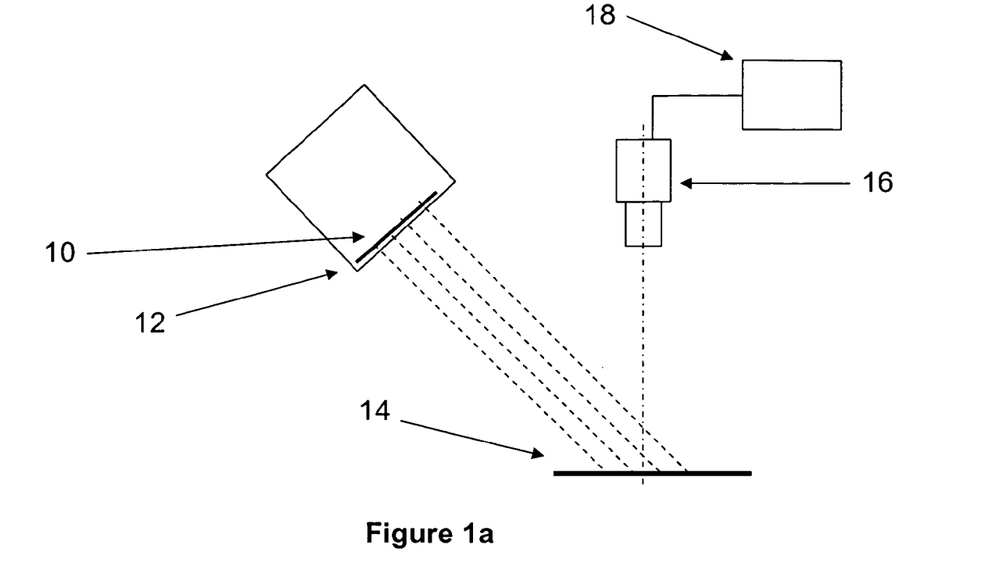
FIG. 1a, 1b and 1c are diagrammatic views showing profilometry as implemented by common prior art systems.
Figure 1B:
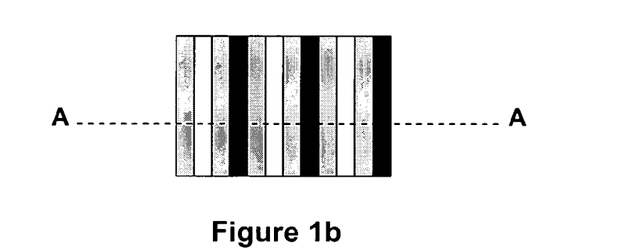
Figure 1C:
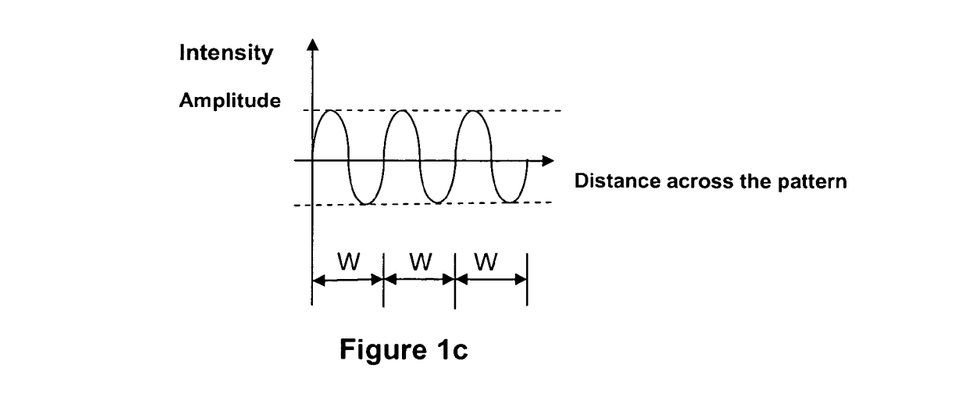

Optical phase-shifting profilometry of the prior art is a well-known non-contact technique for constructing three-dimensional profiles of objects, as discussed by M. Halioua, U.S. Pat. No. 4,641,972, Halioua, M. and Liu, H.-C., "Optical Three-Dimensional Sensing by Phase Measuring *Profilometry*," Opt. Lasers Eng., 11(3), 185-215 (1989) and J. E. Greivenkamp and J. H. Bruning, "Phase shifting interferometry," in *Optical Shop Testing*, D. Malacara (ed.), Wiley, New York, 1992. The method has been adopted, used and documented in numerous applications in the past, such as disclosed in U.S. Pat. Nos. 6,639,685 to Gu, et al, 6,525,331 to Ngoi et al, 6,438,272 to Huang et al, 6,208,416 to Huntley et al, 5,471,303 to Ai et al, and "Adaptation of a Parallel Architecture Computer to Phase Shifted Moiré Interferometry," Proc. SPIE, Vol. 728, 183-193 (1986). Referring to FIG. 1*a*, one prior art method involves obliquely projecting a varying-intensity pattern 10 using a projector 12 onto a surface under examination 14, and then viewing surface under examination 14 using imaging device 16, which may be a CCD camera. The image produced by imaging device 16 is digitally recorded by computer 18. An example of the varying intensity pattern 10 is shown in FIG. 1*b*. The projected pattern is then shifted (using a mechanical positioning system or suitable device) along a direction of intensity variation by a known fraction, for example, ¼ of the wavelength of the intensity waveform, and another image of surface under examination 14 is captured by imaging device 16 and recorded by computer 18. This process is repeated until the total amount of shift is equal to one whole wavelength of the intensity waveform, as shown in FIG. 1*c*. For example, if the amount of shift is ¼ of the wavelength, then altogether 4 images of surface under examination 14 will be captured. These images will correspond to 0, 90, 180, and 270-degree phase shifts of the intensity pattern. Similarly, if the amount of shift is $\frac{1}{8}^{th}$ of the wavelength, then 8 images will be captured. For those who are not fully familiar with the art of phase-shifting profilometry, the term "wavelength" here refers to the distance that covers one complete cycle of intensity variation and NOT the wavelength of the illumination source that is used for projecting the varying intensity pattern 10. Once all images have been acquired, phase values of the projected intensity pattern are computed for each pixel using a phase calculation technique such as that reported in B. V. Dorrio and J. L. Fernandez, "Phase-evaluation methods in whole-field optical measurement techniques," *Measurement Science*, 10, 33-55, 1999, and Asundi, A., "Fringe Analysis in Moiré Interferometry," Proc. SPIE, Vol. 1554B, 472-480 (1991). These phase values are known as "wrapped" phases as they have a range of $-\pi$ to $\pi$. These wrapped phases will then be further processed thru an "unwrapping" operation such as those described in Zebker and Lu, "Phase unwrapping algorithms for radar interfreometry: residue-cut, lease squares, and synthesis algorithms", J. Opt. Soc. Am. A/Vol 15, No 3, March 1998, Herraez, Gdeisat, Burton and Lalor, "Robust, fast and effective two dimensional automatic phase unwrapping algorithm based on image decomposition", Applied Optics, Vol 41, No 35, December 2002, Herraez, Burton, Lalor and Gdeisat "Fast two-dimensional phase-unwrapping algorithm based on sorting by reliability following a noncontinuous path", Applied Optics, Vol 41, No 35, December 2002, Asundi and Wensen, "Fast phase-unwrapping algorithm based on a gray-scale mask and flood fill", Applied Optics, Vol 37, No 23, August 1998. Any of these methods of the prior art will reveal height variations of surface under examination 14.

As explained above, phase-shifting profilometry requires multiple images of the scene to be captured. This repeating process of projecting a pattern onto a surface under examination and acquiring an image of that surface and shifting the pattern is too time-consuming for certain applications where speed of obtaining a three-dimensional profile is critical. Such applications include, for example, volumetric measurement of solder paste or flux deposits on printed circuit boards, and height measurement of solder ball or bumps. Attempts have been made to speed up the "project-acquire-shift" cycle by using solid-state projection devices such as LCD projectors as opposed to shifting the pattern using mechanical systems. However, these approaches are still too slow for applications requiring high speed or high throughput.

Another important issue is that calculation of wrapped phases, which directly influence accuracy of computing height values, is noticeably sensitive to a number of intensity values sampled at a point. Existing systems use a 3 or 4-step phase shift process, which implies that 3 or 4 images need to be captured. To improve accuracy of calculating wrapped phase values, many more samples are needed. Experiments have shown that for industrial applications, more than 8 intensity samples are needed. Moreover, computation of wrapped phases and subsequently, derivation of the height measurement at any point within a surface being examined, relies on obtaining well-illuminated images. This means that phase-shifted images should not be under-exposed (too dark) or over-exposed (too bright) so that there would be too little change from one phase-shifted image to a next phase shifted image at the same point in the scene. When the images are under or over-exposed, phase calculation will simply fail to yield a correct phase angle and consequently a height calculation will be incorrect. With scenes that contain objects of relatively uniform reflectivity, optimum imaging conditions may be found so that under or over-exposed situations will be minimized or eliminated. However, with most practical applications such as inspection of printed circuit boards or electronic wafers, a scene usually contains objects with substantially varying reflectivity from one part to another part. For example, a printed circuit board may contain solder paste, copper pads, solder mask, prints, copper traces and plastic electronic components of different color and reflectivity. In these situations, finding a compromise that works well for all parts of the scene can pose a serious challenge. Current methods do not address the issue of under or over-exposed images in a manner that lends itself to high-speed inspection.

A technique proposed in U.S. Pat. No. 5,646,733, to Bieman, and U.S. Pat. No. 6,522,777, to Paulsen et al uses a tri-linear imaging sensor for capturing images of three different phases at the same time. Basically, this technique uses an imaging device that has three rows of imaging cells (pixels) spaced from each other. The projected pattern and imaging optics are arranged such that each row of imaging cells will image a line-section of a scene that is illuminated with a known phase shift. For example, a first row of imaging cells will image a section of a scene illuminated by 0-degree phase-shift, a second row of imaging cells will image a section illuminated by 120-degree phase-shift and a third row of imaging cells will image a section illuminated by 240-degree phase-shift. The images from all three rows can be combined to compute a wrapped phase angle for all points along a line section of the scene. To construct a complete surface profile of an entire scene, the imaging head is moved to scan an area of interest and acquire a large number of profile slices that collectively describe the surface under examination. Although the invention works for its intended purpose, in practice its use is very limiting. A primary reason for this is that the invention of the prior art does not address the problem of under or over-exposed image sections that yield invalid height measurements, and more importantly a fixed number of imaging rows imply the limitation that there are only as many phase-shifted patterns as there are rows of imaging cells, in turn significantly limiting measuring capability of the system. In practice, a measuring resolution of optical phase-shifting is heavily dependant on the number of images taken to compute a phase angle, and with only three images, accuracy of the results may not be sufficient. Moreover, fixed spacing between rows of imaging cells implies that for a given wavelength of projected pattern, the imaging optics must be set up so that the imaging device will image the correct sections of the projected pattern. This in turn implies that design of imaging optics for the system will be dedicated by geometry of the imaging sensor and desired wavelength of a projected pattern. Hence, one has no control over spatial resolution of the system in a plane along a surface being examined. This is a serious practical limitation.

Another technique proposed in U.S. Pat. No. 6,040,910, to Wu et al, attempts to address the issue concerning under and over-exposed images. The technique of this prior art reference projects a number of references intensities onto an entire surface being examined and records resulting images that in turn are processed by a computer to compute an intensity amplitude for each point (pixel) within the scene so that all parts of the phase-shifted images are well-illuminated. Computed amplitudes are then used to control intensity of projected patterns whereby a temporal illumination system is used to dynamically construct and project the phase-shifted patterns. This technique offers a good solution for those cases where there is sufficient time to manipulate an illumination source and construct projected patterns on a scene-by-scene basis. However, for high-speed applications, this is not a practical solution as it is too slow.

A technique presented in U.S. Pat. No. 6,509,559, to Ulrich et al, describes a method of projection that uses binary patterns to construct a sinusoidal pattern on a surface being examined with a view towards improving contrast of acquired intensity values.

DETAILED DESCRIPTION OF THE DRAWINGS

The present invention utilizes a new generation of 2 D, CMOS imagers having a high image capture bandwidth and random addressing capability of reading pixel values within a sensor area. As will be explained, the present invention offers a novel and unobvious approach to scanning optical phase-shifting technique with the following unique features. Unlike other scanning techniques, Applicant's approach uses a random-access 2 D, CMOS imager (such as the MT9M413 from Micron Technology Inc.), which can produce both 2 D images, in the same way as conventional area-scan cameras do, and phase-shifted data needed to compute height. This is an important feature because it allows the same imaging device to be used in 2 D mode for setup, calibration and all other tasks that require a stable and stationary environment, and multiple line-scan mode when phase-shifted data needs to be collected.

Unlike the method presented in U.S. Pat. No. 5,646,733 and U.S. Pat. No. 6,522,777 that use image sensors with only a few rows of pixels such as tri-linear sensors, the large image format and random-access capability of a CMOS imager used with this invention facilitates examination of any section of a field of view and thereby opens possibility of optimizing a projected varying intensity pattern without having to worry about its implication on the imaging device. For example, for a given field of view of the imaging device, wavelength of a projected pattern can be changed (perhaps automatically under computer control through a programmable projection device such as a miniature LCD) to suit the application at hand. In this situation, all that is needed is to command the imaging device to output data related to those sections of an image where a projected pattern needs to be directed.

Applicant's invention has a high imaging bandwidth much higher than a bandwidth of the prior art and which can be utilized to improve measurement accuracy, deal with under and over-exposed image sections, extend a measuring range, overcome a well-known "shadowing effect" associated with oblique projection or viewing or any combination of these at the same time.

Figure 2:
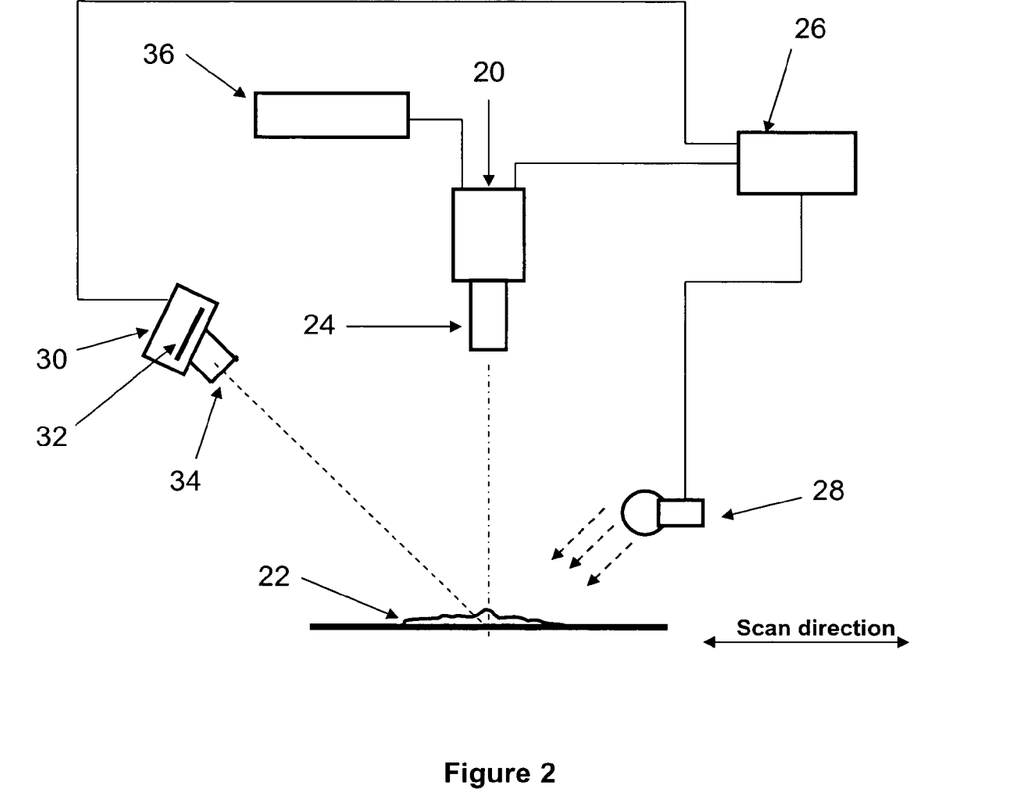
FIG. 2 is a block diagram of a profilometry system of my invention.

Referring to FIG. 2, one possible embodiment of Applicant's invention is shown. Here, imaging system 20 views a workpiece or scene 22 through imaging lens 24. Under command of a computer 26, illumination system 28 or an illuminating projector 30 may be selectively energized. In other words, when a 2 D image of scene 22 is required, illumination system 28, which may be a machine vision light source, is energized while projector 30 is switched OFF and Imaging system 20 is commanded to acquire a full frame and transmit a resulting image to computer 26 for further analysis. Alternatively, when three-dimensional profile data is needed, illumination system 28 is switched OFF and projector 30 is switched ON to project a varying intensity pattern 32 through a projector lens 34. Lens 34 may incorporate a Shiempflug principle for uniform focusing across a field of view of imaging system 20. In this mode of operation, a projector 30, varying intensity pattern 32 and projector lens 34 and imaging system 20 including imaging lens 24 will be moved together along the scan direction, position sensor/controller 36 is used to trigger imaging system 20 at known intervals along the scan to capture phase-shifted images to measure height of features of the scene and to obtain a profile slice. Thus, a three-dimensional map of scene 22 is constructed using many profile slices. Of course, it is possible to keep the projection and modules stationary and move scene 22, which has the same effect as far as phase-shifting profilometry is concerned.

Imaging system 20 may be constructed as follows. The imager may be a high-speed, random-access sensor such as the MT9M413 from Micron Technology, Inc. as mentioned above. This is a CMOS imaging device having 1024 rows and 1280 columns of pixels. The device is capable of capturing images at a rate of 660 million pixels per second, or approximately 500 frames per second. Since each row of the imager may be accessed randomly and independently, the imager may be driven at over 500,000 image rows per second. In other words, one row of 1280 pixels may be acquired at over 500,000 cycles per second (cps), or two rows at 250,000 cps, or 64 rows at 8000 cps, or 128 rows at 4000 cps, or 1024 rows (the entire frame) at 500 cps. As mentioned above, the imager may access rows of pixels randomly. Hence, it is possible to drive the imager so that it produces image data for any number of rows positioned anywhere within the sensor.

Figure 3:
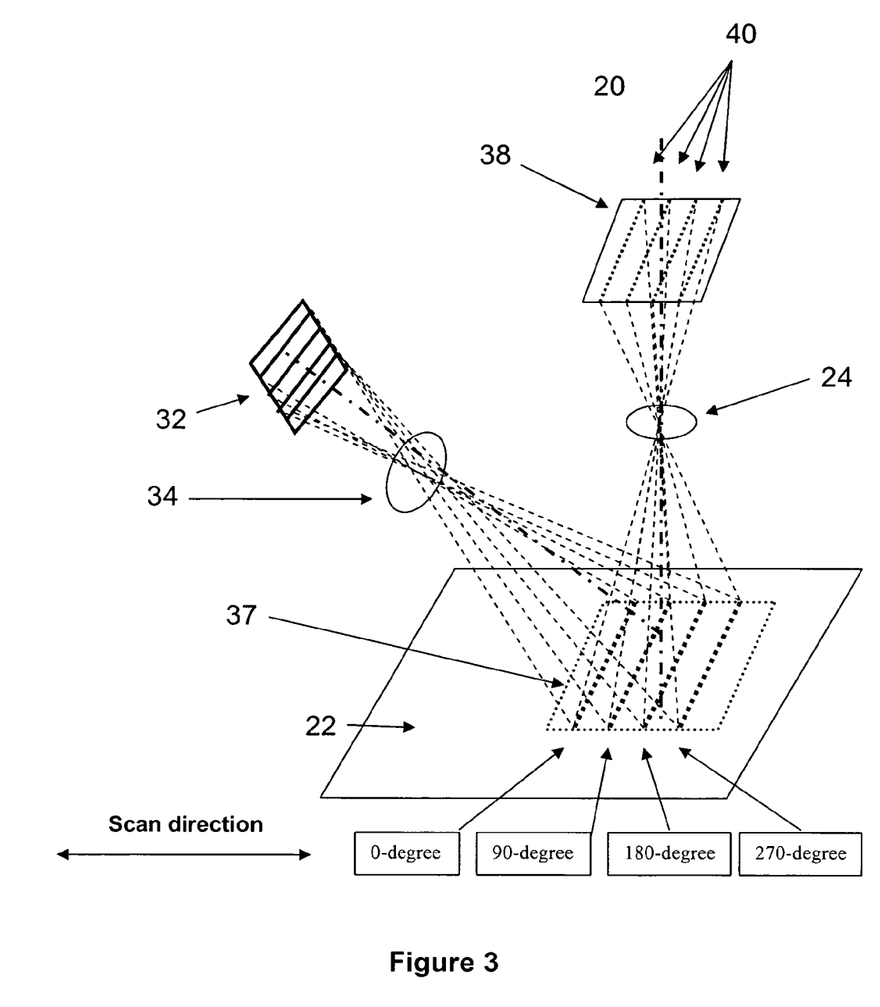
FIG. 3 is a diagrammatic view of functional details of how my new profilometry system operates.

Since imaging system 20 and varying intensity pattern 32 play vital roles in the instant invention, their combined method of operation is described in more detail. FIG. 3 is used to describe how varying intensity pattern 32 is used to construct different patterns that are imaged by imaging system 20. With reference to FIG. 3, varying intensity pattern 32 is projected, through projection lens 34, onto scene 22 and field of view 37 is imaged through imaging lens 24 by CMOS imager 38. Note that CMOS imager 38 is an integral part of imaging system 20, Consider that the entire optical arrangement (32, 34, 38, 24) is moving in a scan direction, as indicated by the arrow in FIG. 3. Furthermore, consider that CMOS imager 38 is programmed to acquire only image rows 40 where a phase shift in the intensity pattern matches a predefined interval. In the case of FIG. 3, the phase-shift is chosen to be 90 degrees. Hence, CMOS imager 38 captures 4 rows of images when these rows coincide with the phase shift of varying intensity pattern 32 and has known values of 0, 90, 180 and 270 degrees. As the scanning operation progresses, imaging system 20 is triggered by position sensor/controller 36 which in turn triggers CMOS imager 38 so that image rows 40 a captured at a regular, small interval. In other words, every time CMOS Imager 38 is triggered by position sensor/controller 36, the 4 rows of images are captured and stored. As the scanning operation progresses, at some time, the physical location that was imaged previously by the first row of image rows 40 will fall directly in the view of the second row, and, similarly, the location that was imaged previously by the second row will fall directly in the view of the third row, and similarly between the third and fourth rows. Hence, as the result of the scanning operation, CMOS imager 38 captures images of the same section of scene 22 under illumination provided by all phases of varying intensity pattern 32. Once all the required phase-shifted rows of images are available, the wrapped phase values for all pixels of an image row may be computed and further processed to compute height values. This process is repeated for all rows to scan the scene of interest. It should be noted that this process is exceedingly fast in comparison to known prior art methods for the aforementioned reasons.

Further examination of the scanning method of the instant invention in relation to the bandwidth of the high-speed, random-access CMOS imager 38 will highlight how Applicant's proposed approach may be used to overcome some of the problems with optical phase-shift profilometry. One factor that affects accuracy of phase-shifting profilometry is a number of phase-shifted intensities used to compute wrapped phase values. The greater a number of phase-shifted intensities, the more accurately wrapped phases can be calculated. Obviously, to get more phase-shifted intensity values, more phase-shifted images must be collected. Assuming that 4 phase-shifted intensities are used for a phase calculation, and taking bandwidth of Applicant's use of a MT9M413 imager into consideration, it is seen that Applicant's method is capable of producing over 125,000 (500,000/4) height profile slices per second, with each profile having 1280 data values. Hence, height values can be computed at a rate of over (1280*125,000) 160 million samples per second. This rate is about an order of magnitude higher than even the fastest systems of the prior art available today. In order to cope with this very high data rate, Applicant's method incorporates a programmable logic device such as PLD, FPGA, etc. to compute wrapped phase values. This ensures that storage of phase information can be achieved using cost-effective solutions. In other words, only computed useful information, such as phase angle or height values, are sent to a memory storage device as opposed to all raw data needed to perform the calculation. For example, a low-cost frame grabber interfaced with a desktop PC may be used and simply record wrapped phase values, as computed by a programmable logic device, as oppose to collecting raw data and having to perform computations on the PC side.

The high sampling rate of Applicant's system can be advantageously used to address a number of commonly known problems encountered with optical phase-shifting profilometry. These are described next.

Figure 4A:
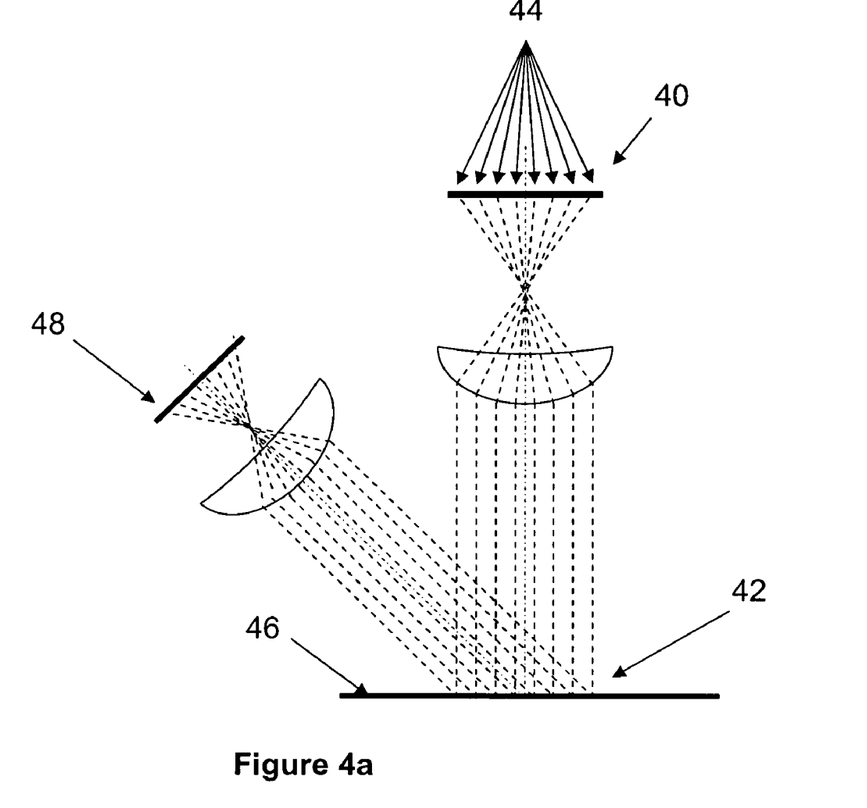
FIGS. 4a and 4b are diagrammatic illustrations of acquisition of data from a plurality of rows of pixels of a randomly-addressable CMOS sensor.
Figure 4B:
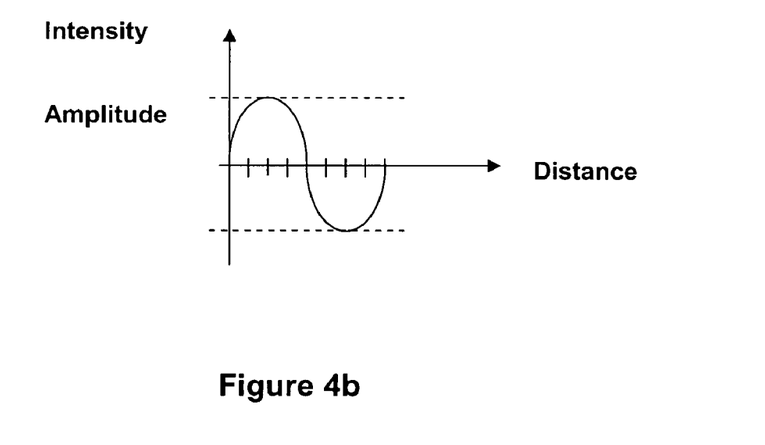

As mentioned earlier, one factor that significantly influences accuracy of height information is a number of phase-shifted intensity values recorded for each point within a surface under examination. Since Applicant's method uses a random-access imager, the imager may easily be commanded to take more samples of a projected pattern at closer phase-shift intervals to improve accuracy. For example, rather than taking 4 samples (images) with a 90-degree phase shift, 8 samples with 45-degree phase shift, or say 16 samples with 22.5-degree shift may be taken. FIG. 4a illustrates how 8 samples with 45*degree shift may be taken. Referring to FIG. 4a, it is seen that CMOS imager 40 is programmed to acquire image rows 42 which now span 8 selected rows 44 within sensor 40 and image corresponding parts of scene 46, which in turn corresponds to 8 phase-shifted intensity values displayed by varying intensity pattern 48. These intensity values are shown in FIG. 4b, which also illustrates a sinusoidal intensity pattern 48.

Since an overall data rate of CMOS imager 40 is fixed and independent of a number of image rows captured, the relationship between speed of the profiling system and number of phase-shifted samples is inversely linear. This means that doubling a number of phase-shifted samples reduces scanning speed by half. So, for a 45-degree phase-shifted sampling scheme requiring 8 suitably spaced rows of images, a height output rate of Applicant's proposed system is around 80 million samples per second, which is still much faster than comparable sampling systems of the prior art. This approach may be taken even further by taking 32 rows of images (11.25-degree phase-shift) and building a system with a very high degree of accuracy and still achieve an output rate of over 20 million samples per second.

Figure 5A:
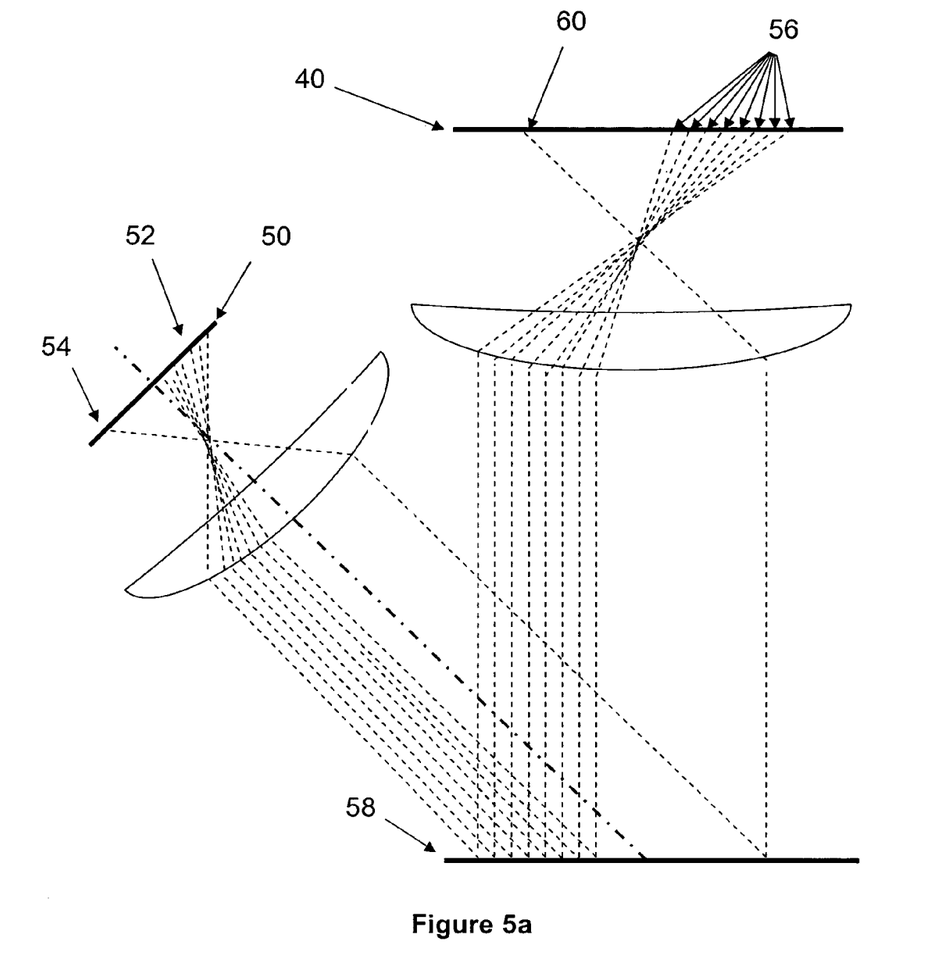
FIGS. 5a and 5b are diagrammatic illustrations showing division of rows of pixels into sets for purposes of data collection.
Figure 5B:
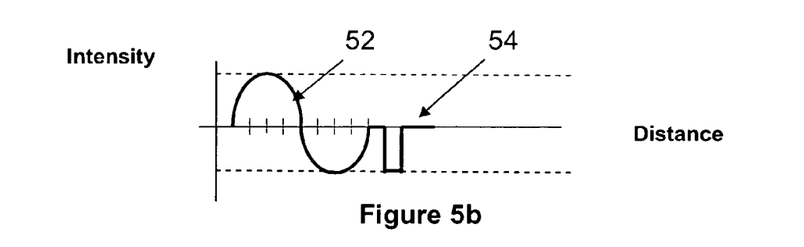

With some applications, it may be desirable to acquire a three-dimensional surface profile and another type of image within the same scan. For example, one may be interested in obtaining a 2 D image of a surface under examination simultaneously with acquiring three-dimensional data. One example of such an application is inspection of partially populated printed circuit boards that contain both solder paste deposits and some components. In this situation, one may be interested in three-dimensional information related to solder paste deposits to verify their volumetric properties for quality control purposes and at the same time it may be desirable to perform checks on placed components, such as verifying their proper positioning. Obtaining 2 D image data in parallel with 3 D profile information has been addressed in U.S. Pat. No. 6,522,777. However, this prior art technique involves interleaving image acquisition cycles required for 2 D and 3 D analysis through the use of a strobe mechanism. This interleaving operation can affect the overall performance of the system and results in imaging complexity. The present invention addresses combined 2 D and 3 D imaging without use of any strobe light or interleaving operation by dividing imaging rows of CMOS imager 40 into two or more distinct sets, as shown in FIG. 5a. Here, intensity values produced by varying intensity pattern 50 is modified to represent a pattern as shown in FIG. 5b, the pattern being divided into two sections. Sub-pattern 52, a sinusoidal light intensity pattern, is dedicated to obtaining phase-shifted intensity values for calculation of three-dimensional data, and sub-pattern 54 is dedicated to an additional imaging task. Rows of images captured by CMOS imager 40 are also divided into two sections. One section 56 is used to image a section of scene 58 illuminated by sub-pattern 52 and the other section 60 is used to image an area illuminated by sub-pattern 54. It is to be noted that due to random-access capability of CMOS imager 40, a pattern may be generated having sub-patterns to address requirements of the application at hand.

Figure 6A:
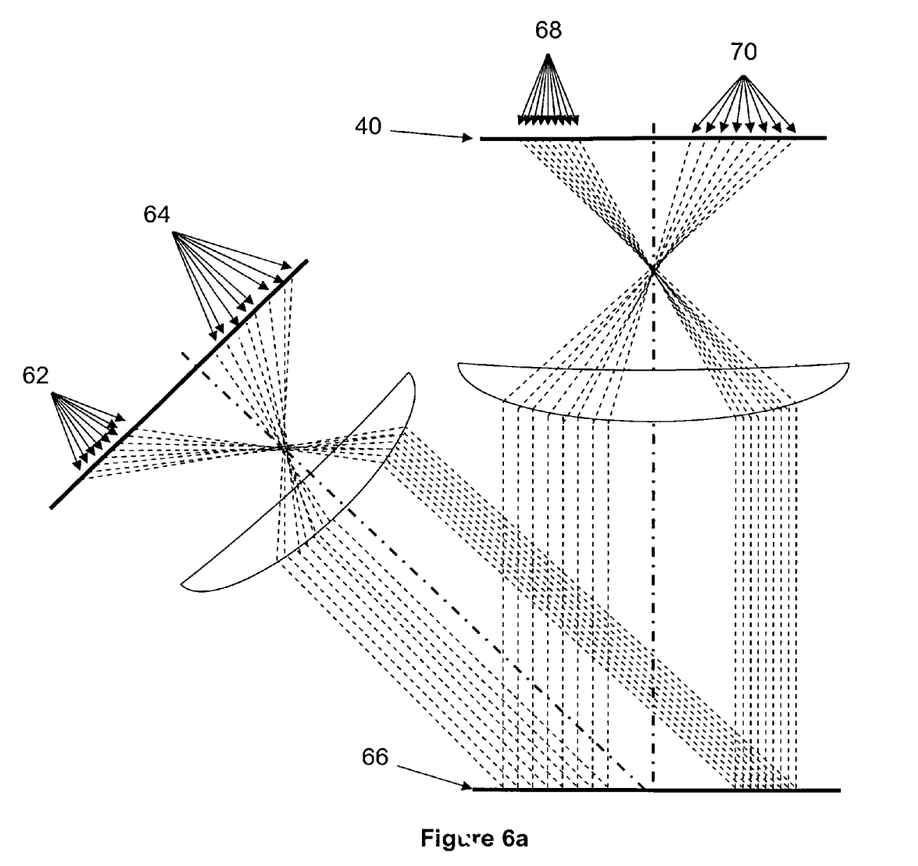
FIGS. 6a and 6b are diagrammatic illustrations showing projection of different light patterns and acquisition of data related to these patterns.
Figure 6B:
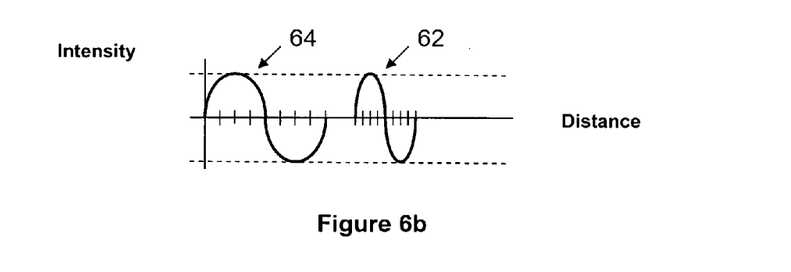

A common issue with optical phase-shifting profilometry is finding a best compromise between a resolution and measuring range. Basically, or a given setup, resolution and measuring range are directly related to wavelength of a projected varying intensity pattern. On one hand, the smaller the wavelength the finer a measuring resolution, and on the other hand, the longer the wavelength the larger a measuring range. Given that in many cases a largest measuring range is needed, and with highest resolution, a proper selection of wavelength that meets both requirements is difficult to find. The present invention addresses this issue by taking advantage of a very high bandwidth of CMOS imager 40. This is shown in FIG. 6a, which illustrates a similar situation to that shown in FIG. 5a. In this instance, two sets of sub-patterns, namely sub-pattern 62 and sub-pattern 64 are projected onto scene 66. Sub-pattern 62 has a same amplitude as that of sub-pattern 63 but its wavelength is smaller than that of sub-pattern 52. CMOS imager 40 is programmed to acquire data from two sections 68 and 70. Each section is treated independently and may be used to acquire phase-shifted intensity values and subsequently compute height values. Since a wavelength of sub-pattern 62 is smaller than 63, resulting height values will have better resolution. On the other hand, height values computed from intensity values produced by 62 will have a larger measuring range. For simplicity, only two sets of projected patterns are shown. In theory, any number of sets of sub-patterns may be projected, and it is emphasized that the present invention is not limited to any known theoretical limitation as far as a number of sets of projected sub-patterns is concerned. Applicant's approach may be further refined by ensuring that wavelengths of sets of wavelengths are incremented by a factor of 2. That is, following sets of wavelengths have a wavelength twice that of a preceding set of wavelengths, a third set has a wavelength twice that of a second set, and so on. Actual height value can then be determined by taking all height values obtained from analysis of intensity data from each set of projected sub-patterns. With this approach, a high precision may be achieved, as defined by shortest wavelength, and a high measuring range, as defined by longest wavelength, all at the same time.

Figures 7A, 7B:
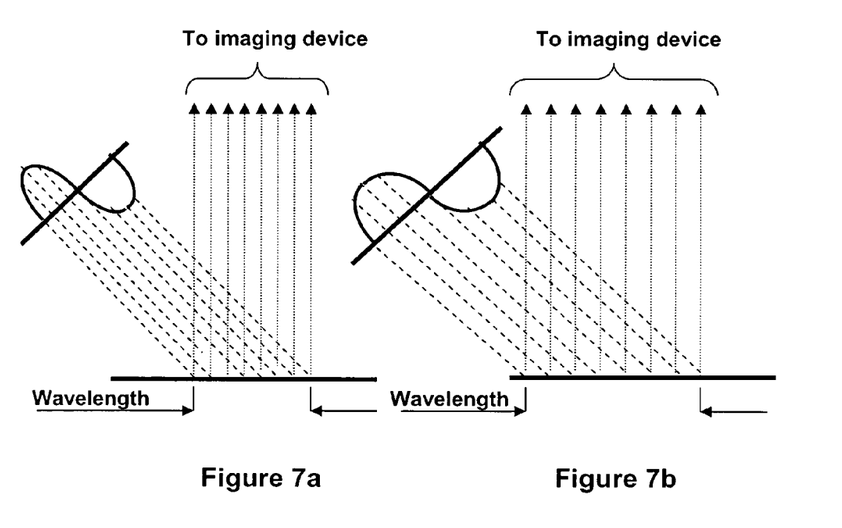
FIGS. 7a and 7b are diagrammatic illustrations showing how a measuring range of my invention may be controlled.

Applicant's method, as described above, can be further expanded to implement a measurement system having a programmable measuring range and, depending on the application at hand, the measuring range can be set accordingly, perhaps under computer control. Referring to FIGS. 7a and 7b, it is seen that a sinusoidal wavelength of a projected sub-pattern of FIG. 7b is larger than a sinusoidal wavelength of FIG. 7a. Hence, height values produced as a result of using a sub-pattern as shown in FIG. 7b has a larger measuring range. In order to image intensity patterns corresponding that correspond to appropriate phase shifts in a projected intensity pattern, the correct imaging rows within the sensor must be selected. Since imager 40 used with this invention offers random access to any row, CMOS imager 40 may be controlled so that it outputs image data for appropriate rows. As a result, the same imaging arrangement may be used to alter measuring characteristics of the system. The only adjustment needed is to set wavelength of a projected pattern to suit the application. This can be done by using a programmable projection device such as an LCD projection device that can be controlled by the measurement system.

Figures 8A, 8B:
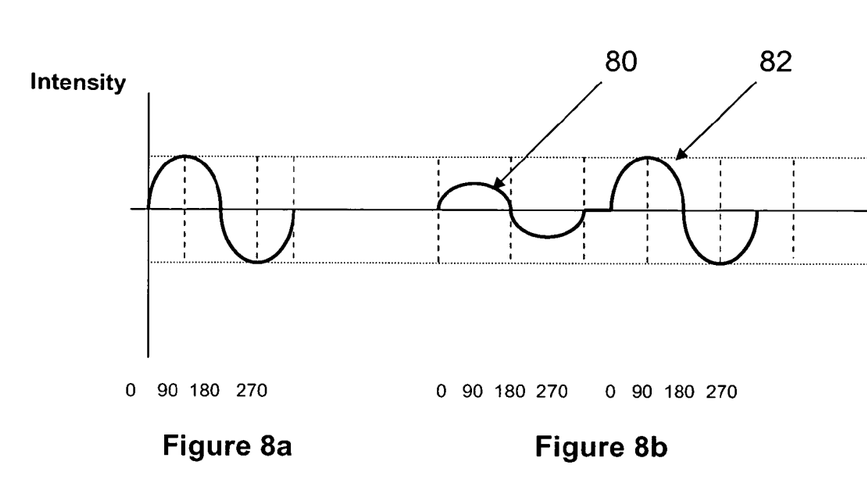
FIGS. 8a and 8b are graphic illustrations of one example of light intensity patterns that may be used with my new profilometry measuring system.

As mentioned previously, one problem often encountered in optical phase-shifting profilomtery is under or over-exposed images leading to incorrect height measurements. Applicant's method addresses this problem by enabling a user to project several sub-patterns simultaneously and use a set yielding a highest dynamic range. Of course, this improvement is achieved at the expense of reducing throughput of the system. In practice, reduced throughout is still well above competing techniques. To understand Applicant's approach, the two sub-patterns that are shown in FIGS. 8a and 8b are compared.

Figure 9:
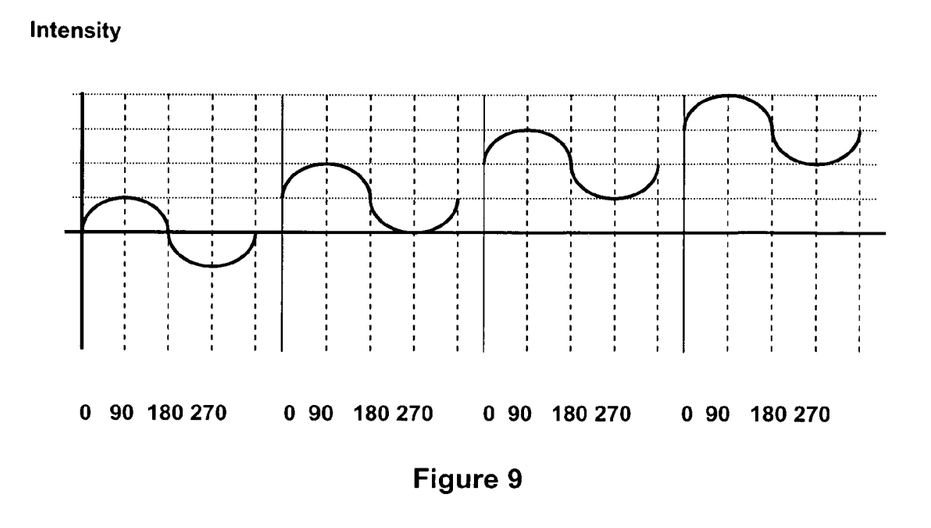
FIG. 9 is a graphic illustration of a plurality of sub-patterns of light intensity that may be used with my new profilometry measuring system.

Using the same concept as described for FIGS. 5a, 5b and 6a, 6b, multiple varying intensity patterns may be projected onto a scene and each projected pattern imaged independently using a designated set of imaging rows of the sensor. Referring to FIG. 8a, if a sub-pattern shown in the Fig. is used to obtain phase-shifted images, then depending on surface reflectivity, resulting intensity values may be under or overexposed. To overcome this problem, the arrangement shown in FIG. 6a and the pattern shown in FIG. 8b are to be noted. This pattern of FIG. 8b comprises two sub-patterns wherein a first set 80 has less contrast (amplitude) than a second set 82. Using my system, a multiple sub-pattern projection technique may be employed as described previously to obtain intensity readings from both sets of sub-patterns. These values can then be examined on the fly as a scanning operation takes place in order to detect improper imaging, such as when under or over-exposed situations occur, and take a reading from a set of patterns that is neither under, nor over-exposed and offers best image quality. For simplicity, the above disclosure is limited to two sets of sub-patterns. Obviously, 3 or more sub-patterns may be projected, and each one may be imaged independently by allocating a section within CMOS imager 40 to increase likelihood of one those sets being just right for that section of a scene under examination. Furthermore, relative contrast and shape of sub-patterns can be set in many different ways, some of which are shown in FIG. 9, to achieve different effect depending on the application.

It should be noted that it is possible to combine a mixture of different cases shown in FIGS. 4a-9 to achieve a more sophisticated method of improving resolution, extending measuring range and improving dynamic range. Our invention claim is generic and covers any type of scenario wherein multiple patterns are projected to improve imaging conditions.

Figure 10:
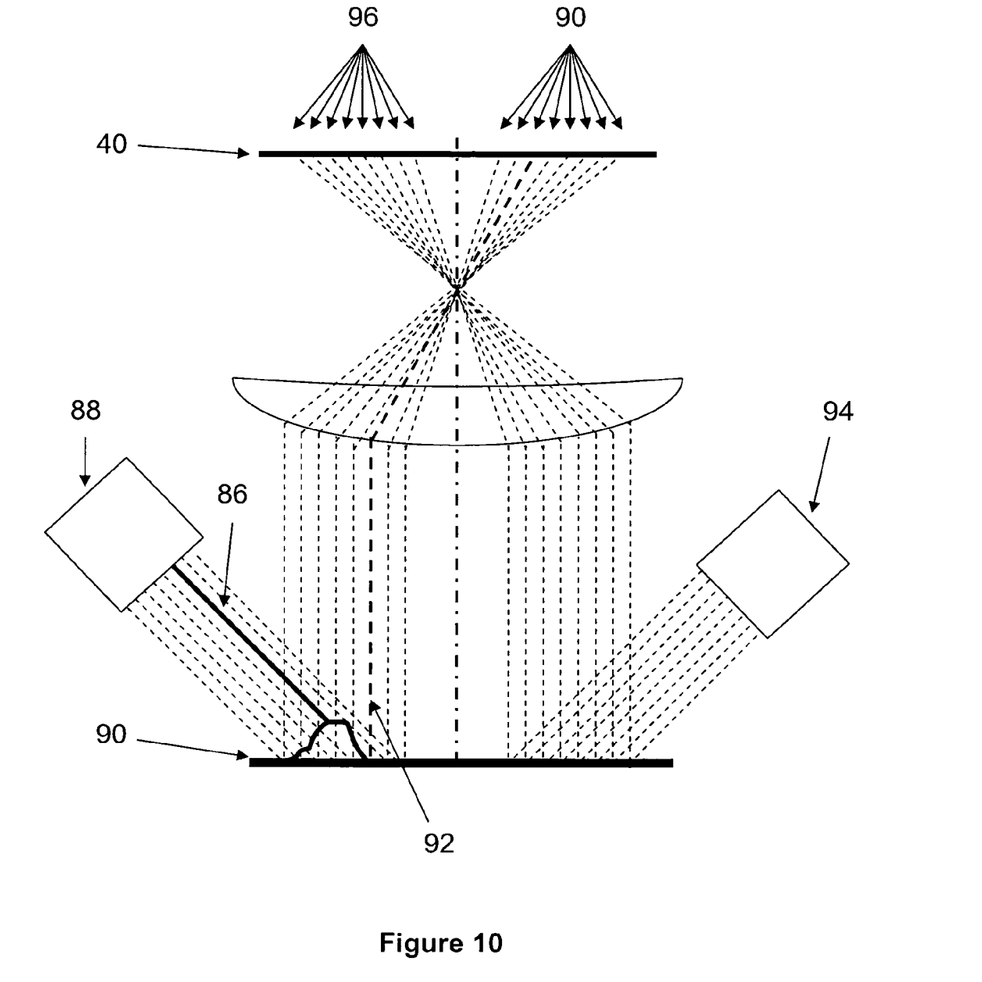
FIG. 10 is a diagrammatic illustration showing how shadowing may be eliminated with my new profilometry measuring system.

Shadowing occurs when there is either oblique illumination or oblique viewing. In simple terms, either projected light will not reach an indented location on a scene, or the imaging system cannot see a surface under examination completely. Shadowing occurs when there is sudden, steep discontinuity within a surface profile. One common way shadowing can be eliminated, or at least minimized, is to use multiple projection patterns from different directions and image each one independently. This is shown in FIG. 10. As can be seen, a blind ray of light 86, projected by a first projector 88 hits a top of an object in scene 90 and becomes obstructed and consequently does not illuminate an other side of the object. As a result, this unilluminated side of the object is improperly illuminated, meaning that imaging rows 90 on CMOS sensor 40 that capture an image of this point, denoted as blind row 92, will not be able to form a proper image. Using a second projector 94 and a second set of imaging rows 96, a pattern may be projected from an opposite side and overcome a shadowing effect. The system can be programmed to detect shadowing situations by examining intensity values and trap those that have low values indicative of shadowing. When a shadowing effect is detected, the system can automatically use measurements from the other of rows 90, 96 that are not affected by shadowing to compute required information.

A further extension of the present invention involves performing phase-shifted image acquisition and subsequent processing on a full image frame basis, as opposed to line-by-line (or row-by-row) basis. To achieve this, a series of images are taken as fast as CMOS imager 40 can acquire them. In the case of the MT9M413 sensor used with this invention, image acquisition rate at full image size is around 500 frames per second. As before, image acquisition is synchronized with position sensor/control 36 (FIG. 2) such that images are taken at known, pre-defined intervals that correspond to a known, pre-defined fraction of a wavelength of a projected intensity pattern. For example, if the wavelength is equal to 1 mm (as viewed in the field of view) and it is desired to have 4 phase-shifted images (at 90-degree intervals), then images will be taken at 0.25 mm intervals during a scanning operation. Since a field of view of an imaging system is larger (often much larger) than a wavelength of a projected pattern, acquired images overlap each other. Hence, by combining data from all images, it is possible to extract phase-shifted intensities for all parts of a scene. These intensity values can be used to compute wrapped phases, which are further processed to compute height values.

Figure 11:
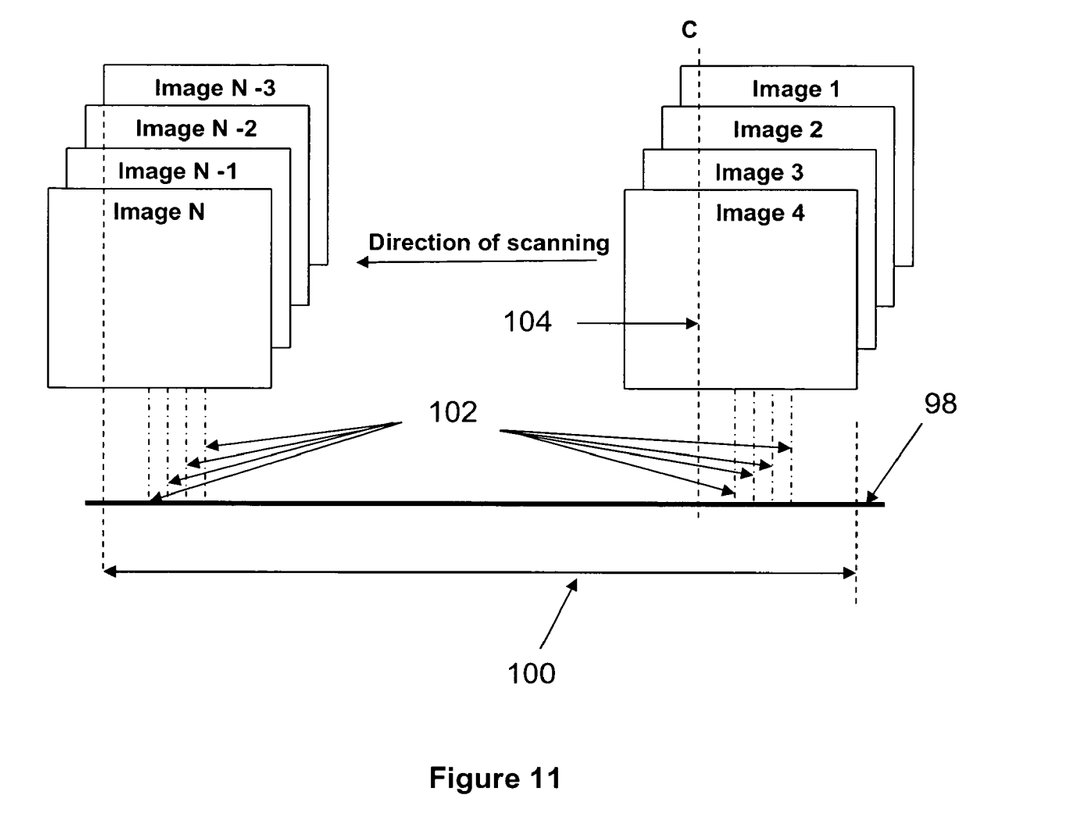
FIG. 11 is a diagrammatic illustration of how a plurality of images may be captured using my new profilometry measuring system.

As can be seen from FIG. 11, to obtain a profile of scene 98, imaging and projection modules are both moved along a straight path to cover a scanned section 98 and obtain N images at regular intervals, denoted by 100. It is important to start and end a scan operation so there is sufficient overlap between acquired images at a start and end points to ensure that all required phase-shifted intensity values exist for all sections of a surface under examination 98. An amount of additional start-of-travel and end-of-travel distances must be larger than wavelength of a projected pattern as viewed by the imaging device. Furthermore, it can be seen that for any arbitrary location within a scanned section 100, intensity values needed to compute height can be read from acquired images. For example, assuming that images are acquired at a regular interval corresponding to ¼ of a wavelength of a projected pattern, as viewed by the imaging device, then for location C, all required intensity values can be obtained from Images 1, 2, 3 and 4, as shown by dotted line 102 running thru the images at Location C. In this example, a section of Image 1 that coincides with dotted line 102 holds intensity values for 0-degree shift, and similarly, a section of image 2 coinciding with the same line 102 holds values for 90-degree shift in the projected pattern, and so on for images 3 and 4. Hence, by taking these intensity values from the images, the height values for all points along section C may be computed. This process can be applied to any point within scanned section 100 for which all phase-shifted intensity values are available to construct a complete surface profile of an entire scanned section. Of course, the process is applicable to cases where a number of phase-shifted images is different than 4 images, as was given in the example. Furthermore, direction of scanning can be reversed to facilitate a serpentine operation to construct a complete 3 D map of a scene.

Having thus described my invention and the manner of its use, it should be apparent to those skilled in the relevant arts that incidental changes may be made thereto that fairly fall within the scope of the following appended claims, wherein I claim:

REFERENCES

1) M. Halioua U.S. Pat. No. 4,641,972
2) Halioua, M. and Liu, H.-C., "Optical Three-Dimensional Sensing by Phase Measuring *Profilometry*," Opt. Lasers Eng., 11(3), 185-215 (1989);
3) J. E. Greivenkamp and J. H. Bruning, "Phase shifting interferometry," in *Optical Shop Testing*, D. Malacara (ed.), Wiley, New York, 1992.
4) U.S. Pat. No. 6,639,685
5) U.S. Pat. No. 6,525,331
6) U.S. Pat. No. 6,438,272
7) U.S. Pat. No. 6,208,416

8) U.S. Pat. No. 5,471,303
9) "Adaptation of a Parallel Architecture Computer to Phase Shifted Moiré Interferometry," Proc. SPIE, Vol. 728, 183-193 (1986);
10) B. V. Dorrio and J. L. Fernandez, "Phase-evaluation methods in whole-field optical measurement techniques," *Measurement Science*, 10, 33-55, 1999.
11) Asundi, A., "Fringe Analysis in Moiré Interferometry," Proc. SPIE, Vol. 1554B, 472-480 (1991);
12) Zebker and Lu, "Phase unwrapping algorithms for radar interfreometry: residue-cut, lease squares, and synthesis algorithms", J. Opt. Soc. Am. A/Vol 15, No 3, March 1998;
13) Herraez, Gdeisat, Burton and Lalor, "Robust, fast and effective two dimensional automatic phase unwrapping algorithm based on image decomposition", Applied Optics, Vol 41, No 35, December 2002;
14) Herraez, Burton, Lalor and Gdeisat "Fast two-dimensional phase-unwrapping algorithm based on sorting by reliability following a noncontinuous path", Applied Optics, Vol 41, No 35, December 2002;
15) Asundi and Wensen, "Fast phase-unwrapping algorithm based on a gray-scale mask and flood fill", Applied Optics, Vol 37, No 23, August 1998;
16) Arai, Yasuhiko, Yekozeki, Shunsuke, and Yamada, Tomoharu, "3-D automatic precision measurement system by liquid crystal plate on moiré-topography," Proc. SPIE, Vol. 1554B, 266-274 (1991))
17) U.S. Pat. No. 5,646,733 (ppt patent)
18) U.S. Pat. No. 6,522,777 (ppt $2^{nd}$ patent)
19) U.S. Pat. No. 6,040,910 (Dynamic projection)
20) U.S. Pat. No. 6,509,559

The invention claimed is:

1. A method comprising:
providing a first sinusoidal wavelength source of illumination obliquely projected and focused onto said workpiece,
developing relative movement between said first sinusoidal wavelength and said workpiece,
focusing light reflected from a workpiece onto a single 2-dimensional sensor having individually addressable rows of pixels,
collecting phase shifted data from said workpiece at selected increments of said first sinusoidal wavelength while said sinusoidal wavelength moves with respect to said workpiece, said collecting phase shifted data comprising collecting said phase shifted data from only selected ones of said individually addressable rows of pixels of a single 2-dimensional sensor,
processing said phase shifted data collected from said only selected ones of said individually addressable rows of pixels to produce a 3-dimensional image of said workpiece.

2. A method as set forth in claim 1 further comprising:
providing a second sinusoidal wavelength source of illumination in the same moving relationship with respect to said workpiece as said first sinusoidal wavelength,
angularly directing said second sinusoidal wavelength onto said workpiece from a direction to eliminate shadowed regions created by said first sinusoidal wavelength,
collecting phase shifted data at selected increments of said second sinusoidal wavelength during said movement between said second sinusoidal wavelength and said workpiece, said collecting phase shifted data comprising collecting data from only selected ones of said individually addressable rows of pixels of said single 2-dimensional sensor.

3. A method as set forth in claim 2 further comprising:
collecting said phase shifted data from said workpiece at selected increments of said first sinusoidal wavelength using a first set of said only selected ones of said individually addressable rows of pixels of said single 2-dimensional sensor, and,
collecting said phase shifted data from said workpiece at selected increments of said second sinusoidal wavelength using a second set of said only selected ones of said individually addressable rows of pixels of said single 2-dimensional sensor, said collecting said phase shifted data from said first sinusoidal wavelength and said second sinusoidal wavelength by said first set and said second set occurring simultaneously.

4. A method as set forth in claim 1 further comprising:
directing a source of uniform illumination at said workpiece,
collecting 2-dimensional data simultaneously with collection of said phase shifted data during said movement between said sinusoidal wavelength with respect to said workpiece, said collecting 2-dimensional data being collected from only selected ones of said individually addressable rows of pixels of said single 2-dimensional sensor not used for collecting said phase shifted data.

5. A method as set forth in claim 1 wherein said providing a first sinusoidal wavelength source of illumination further comprises:
directing light from a light source through a liquid crystal device having imposed thereon a pattern for developing said sinusoidal wavelength,
focusing said light directed through said liquid crystal device onto said workpiece,
using a computer, changing said pattern to change said sinusoidal wavelength.

6. A method as set forth in claim 5 further comprising:
imposing simultaneously a plurality of sinusoidal wavelengths on said liquid crystal device,
using a plurality of sets of said only selected ones of said individually addressable rows of pixels of said single 2-dimensional sensor to read said phase shifted data reflected from said workpiece and developed by said plurality of sinusoidal wavelengths, one of each of said plurality of sinusoidal wavelengths being read by one of each of said plurality of sets of said only selected ones of said individually addressable rows of pixels of said single 2-dimensional sensor.

7. A method as set forth in claim 6 further comprising providing a different wavelength for each of said plurality of sinusoidal wavelengths.

8. A method as set forth in claim 6 wherein said imposing simultaneously a plurality of sinusoidal wavelengths further comprises configuring each sinusoidal wavelength of said plurality of sinusoidal wavelengths so that each said sinusoidal wavelength has a different amplitude of illumination.

9. A method as set forth in claim 6 further comprising:
configuring said plurality of sinusoidal wavelengths so that each said sinusoidal wavelength of said plurality of sinusoidal wavelengths provides a different total amount of illumination,
arranging said plurality of sinusoidal wavelengths on said liquid crystal device so that a first of said plurality of sinusoidal wavelengths provides a least said total amount of illumination and a last said sinusoidal wavelength provides a greatest said total amount of illumination, whereby a dynamic range is increased.

10. A method as set forth in claim 5 further comprising selecting more said only selected ones of said individually addressable rows of pixels for reading said phase shifted data to obtain a higher resolution of features on said workpiece and fewer said only selected ones of said individually addressable rows of pixels are selected for reading said phase shifted data to obtain a higher measuring range.

11. A method comprising:
selecting at least one sinusoidal wavelength illumination pattern of a plurality of sinusoidal wavelength illumination patterns in accordance with characteristics of said workpiece,
imposing said at least one selected sinusoidal wavelength illumination pattern on a liquid crystal device,
passing light from a light source through said liquid crystal device to develop said at least one selected sinusoidal wavelength illumination pattern,
focusing said at least one selected sinusoidal wavelength illumination pattern onto said workpiece,
focusing light of said at least one selected sinusoidal wavelength illumination pattern reflected from said workpiece onto a single 2 dimensional sensor,
developing relative movement between said workpiece and said sinusoidal waveform illumination pattern,
collecting phase shifted data developed by said at least one selected said sinusoidal wavelength illumination pattern at discrete, predetermined intervals of said at least one sinusoidal wavelength illumination pattern by a respective set of a plurality of sets of selected ones of individually addressable rows of pixels of said single 2 dimensional sensor while said relative movement is occurring between said workpiece and said imaging system, one of each of said sets of selected ones of individually addressable rows of pixels of said single 2 dimensional sensor receiving reflected light from a respective selected sinusoidal wavelength illumination pattern of said plurality of sinusoidal wavelength illumination patterns at said predetermined intervals of a respective selected said sinusoidal wavelength illumination pattern,
triggering said collection of data from said selected set of selected ones of individually addressable rows of pixels of said single 2 dimensional sensor at said discrete, predetermined intervals of a selected said sinusoidal wavelength illumination pattern,
processing said phase shifted data.

12. A method as set forth in claim 11 further comprising:
projecting a uniform illumination onto said workpiece,
using a set of said plurality of sets of said selected ones of said individually addressable rows of pixels of said single 2 dimensional sensor to develop a 2 dimensional image of said workpiece.

13. A method as set forth in claim 11 further comprising:
providing a plurality of different said sinusoidal wavelength illumination patterns,
selecting a predetermined number of said selected ones of said rows of individually addressable rows of pixels of said single 2 dimensional sensor for receiving light from a respective said sinusoidal wavelength illumination pattern.

14. A method as set forth in claim 13 further comprising developing light intensity values of a first said sinusoidal wavelength illumination pattern for computing height of features of said workpiece from a second said sinusoidal wavelength illumination pattern.

15. A method as set forth in claim 13 further comprising configuring a first said sinusoidal wavelength illumination pattern and corresponding first said set of said selected ones of individually addressable rows of pixels of said single 2 dimensional sensor for measuring a higher resolution and configuring a second said sinusoidal wavelength illumination pattern and corresponding second said set of said selected ones of said individually addressable rows of pixels for measuring a higher dynamic range.

16. A method as set forth in claim 13 further comprising selecting a said sinusoidal wavelength illumination pattern and corresponding said set of said selected ones of said individually addressable rows of pixels best suitable for measuring height of features on said workpiece from a plurality of said sinusoidal wavelength illumination patterns and corresponding said sets of said selected ones of individually addressable rows of pixels.

17. A method as set forth in claim 11 further comprising using a second said sinusoidal wavelength illumination pattern projected obliquely onto said workpiece and from a direction opposite said first sinusoidal wavelength illumination pattern for eliminating shadowing, said first sinusoidal wavelength illumination pattern registered by a first said set of said selected ones of said individually addressable rows of pixels and said second sinusoidal wavelength illumination pattern registered by a second said set of said selected ones of said individually addressable rows of pixels.

* * * * *